Oct. 22, 1957  W. O. TYDINGS  2,810,601
INTERCHANGEABLE PAN HOLDER
Filed Dec. 31, 1954
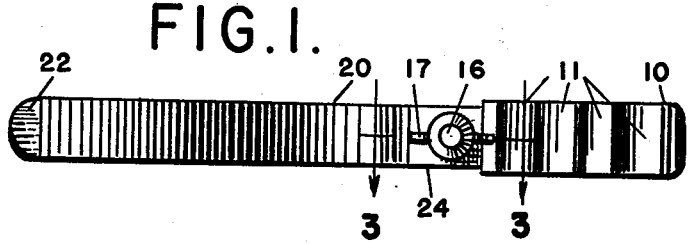
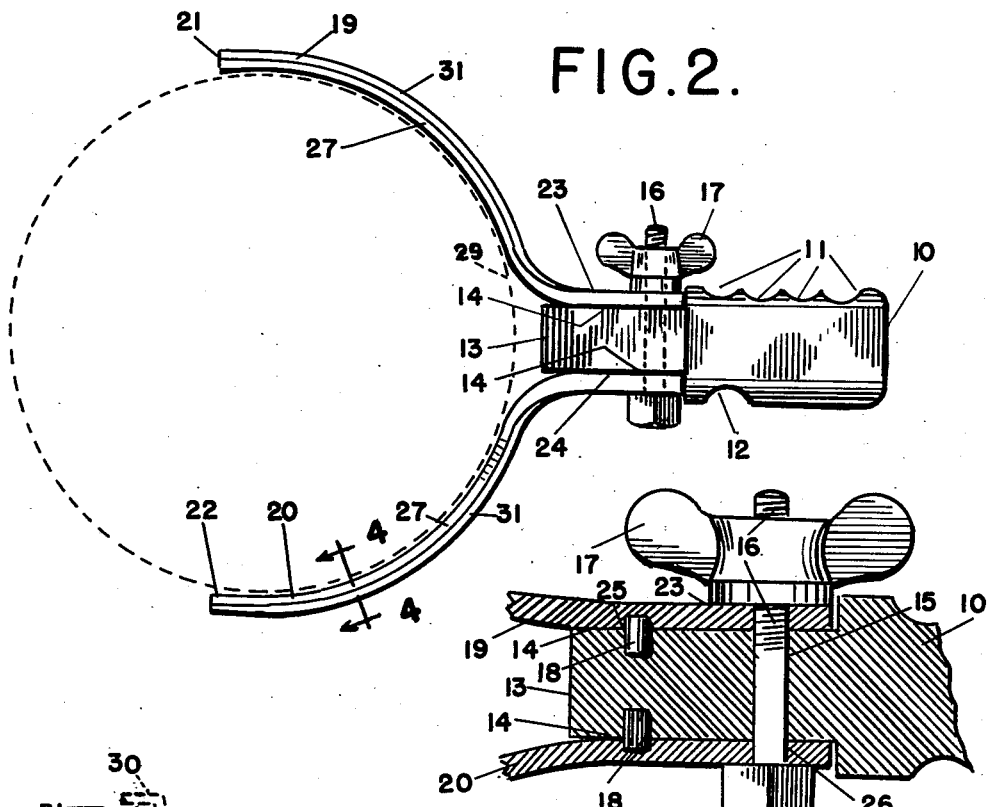
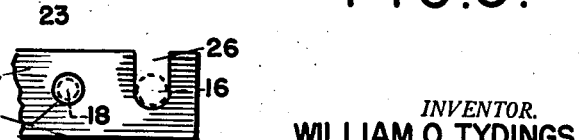
INVENTOR.
WILLIAM O. TYDINGS.
BY Howard J. Whelan
ATTORNEY

2,810,601

INTERCHANGEABLE PAN HOLDER

William O. Tydings, Baltimore, Md.

Application December 31, 1954, Serial No. 479,083

1 Claim. (Cl. 294—33)

This invention relates to kitchen equipment and more particularly to holders or lifters for supporting pie pans and the like.

While holders or lifters of various constructions have been known and used for a long time, especially those suitable for lifting covers of kitchen pots and pans, it has been found that they are not made to specifically raise and support pie pans. In this invention the intent is to provide a new and improved holder that can lift and hold a pan such as is used for pies, and do so effectively and safely.

Another object of the invention is to provide a new and improved pie pan lifter that will be simple in construction, effective in operation, and economical to manufacture.

Other objects of the invention will become apparent as it is more fully detailed.

For a better understanding of the invention and the objects thereof, reference is made to the accompanying drawings wherein a particular form of the invention is shown by way of example. These drawings in conjunction with the following description illustrate the invention, indicate its principles, explain its construction, and show how it can be operated effectively.

Referring to the drawings:

Figure 1 is a side elevation of a pie pan lifter embodying this invention;

Figure 2 is a plan view of Figure 1;

Figure 3 is a sectional view on line 3—3 of Figure 1;

Figure 4 is a sectional view on line 4—4 of Figure 2; and

Figure 5 is a side view of the handle end portion of the jaw member.

Similar reference characters refer to the same parts throughout the drawings.

In the construction shown in the drawings, a pie pan lifter comprises a handle 10. This handle is sized to fit the grip of a normal person's hand. In order to facilitate the holding of the handle, four grooves 11 are carved or impressed on one side in consecutive longitudinal alignment to permit the fingers of an individual to engage therein. On the side opposite these grooves and suitably disposed is another larger groove 12 adapted to take the thumb of a hand and facilitate manipulation. A neck 13 extends from one end of the handle and is made with two opposite sides 14 flattened and drilled transversely at 15. The hole at 15 serves as a passage for a bolt 16 having a winged or knurled nut 17 threadably engaged on it. Spaced a short distance from the passage 15 is a pair of dowels 18 projecting outwardly and oppositely with their axes aligned in parallel with the hole 15. Left and right hand offset jaw members 19 and 20 respectively, have a semi-circular conformation. They are spread apart and curved to the contour of a pie pan, at their free ends 21 and 22 and where they approach closely, the handle end portions 23 and 24 respectively are short and drilled to receive the bolt 16 and dowels 18. The dowels project into sockets 25 in each of the jaw members, while the bolt 16 passes through the transverse lateral slots 26 parallel to the sockets 25.

Members 19 and 20 are bevelled longitudinally on their inner sides 27 to conform with the wall 28 of a pie pan 29. When the handle end portions are clamped together the jaw members will hold the pie pan securely. The members are placed in position by having the dowels inserted in their sockets, after which they are pivotly swung on the dowels so the lateral slots 26 will slide over the bolt 16 extended through the neck 13. When the neck 13 and members 19 and 20 are assembled together, the knurled nut 17 is tightened and the whole unit is ready for use.

The lifter or holder is used by pushing the jaw members 19 and 20 against the periphery of the pie pan so the bevelled sides 27 will grasp it and upper surface portion 31 of the members 19 and 20 will rest under the rim 30. This supports the pie pan 29 and enables the operator to carry the latter and its contents, hot or cold, conveniently away.

The lifter offers a number of advantages. It is easily assembled. In case of necessity its jaw members can be interchanged or replaced for others of different size or form. Its handle with its grooves 11 and 12 prevents the unit from turning unduly and dangerously while being employed in its normal duty. The construction is simple, requiring only three main parts, the handle, jaw members and clamping bolt. Its bolt 16 with nut 17 is the only item that has to be worked on, and avoids the use of extraneous tools, like screw driver, wrench or hammer.

While but one form of the invention has been illustrated in this application for Letters Patent, it is not intended to limit it to such form, as it is appreciated that other forms could be designed and made that would use the same principles and come within the scope of the appended claim.

Having thus described the invention, what is claimed is:

A pie pan lifter, for a pan having a circular contour as well as outer bevelled side walls, comprising, a pair of curved jaw members adapted to embrace the outer side walls of said pan and arranged to assume the circular contour of said pan as well as the bevelled shape of said outer side walls, said jaw members having their free ends spread apart, said jaw members also having parallel end portions extending laterally of said pan supported thereon, said parallel portion having aligned and opposed sockets therein and also having opposed open-ended slots spaced from and parallel to said sockets, a handle having a grip portion and a neck extending between said parallel end portions of said jaw members, said neck having other sockets therein aligned with said first mentioned sockets of said jaw members, dowel pins fitted in said aligned sockets of both said jaw members and said neck of said handle, a bolt extending through the aforementioned open-ended slots and through said handle, and a nut on said bolt to secure the parts together, said jaw members being arranged to pivot about said dowel pins and away from said bolt to detach said jaw members from said handle.

References Cited in the file of this patent

UNITED STATES PATENTS

| | | |
|---|---|---|
| 1,247,355 | Wildberger | Nov. 20, 1917 |
| 1,859,614 | Boever | May 24, 1932 |
| 1,977,367 | Wolcott | Oct. 16, 1934 |
| 2,137,884 | Weeks | Nov. 22, 1938 |
| 2,551,300 | Sullivan | May 1, 1951 |